United States Patent [19]

Guardini

[11] Patent Number: 4,483,829
[45] Date of Patent: Nov. 20, 1984

[54] PROCESS FOR RECOVERING PROTEINS AND CHROMIUM FROM CHROME-TANNING WASTE

[76] Inventor: Giuliano Guardini, Via Ca Nove, Isola Vicentina (Vicenza), Italy

[21] Appl. No.: 461,501

[22] Filed: Jan. 27, 1983

[30] Foreign Application Priority Data

Feb. 2, 1982 [IT] Italy ............................. 85511 A/82
Jul. 16, 1982 [IT] Italy ............................. 22416 A/82

[51] Int. Cl.³ ............... C01G 37/02; C01G 37/08; C14C 3/32; A23J 1/10
[52] U.S. Cl. ............................. 423/55; 8/94.27; 210/688; 210/722; 260/118; 423/53; 423/544
[58] Field of Search ............ 423/55, 57, 544, 53; 8/94.27; 260/118; 210/722, 688

[56] References Cited

U.S. PATENT DOCUMENTS

| | | | |
|---|---|---|---|
| 2,339,405 | 1/1944 | Hoeren | 260/118 |
| 2,413,676 | 1/1947 | Behrman | 210/688 X |
| 2,667,417 | 1/1954 | Delmousée et al. | 210/688 X |
| 3,461,067 | 8/1969 | Matsumoto et al. | 210/722 X |
| 3,950,131 | 4/1976 | Young | 8/94.27 |
| 4,100,154 | 7/1978 | Holloway | 260/118 X |
| 4,393,029 | 7/1983 | Heimala et al. | 423/55 |

FOREIGN PATENT DOCUMENTS 2042489  9/1980  United Kingdom ................ 423/55
633808  11/1978  U.S.S.R. ............................ 423/55

Primary Examiner—G. L. Kaplan
Attorney, Agent, or Firm—Karl F. Ross; Herbert Dubno

[57] ABSTRACT

Waste products from the chrome-tanning of hides are washed and then chopped in water, with subsequent hydrolyzation at a pH of at least 10.5 and at boiling or near-boiling temperature. The resulting suspension is filtered to yield a polypeptide solution and a cake of solids consisting essentially of chromium hydroxide. The solution is neutralized, dehydrated, cooled and filtered to provide a virtually chromium-free proteinaceous substance usable as plant or animal feed; the solids are washed, filtered and acidified to provide chromium sulfate suitable for reutilization in tanning.

14 Claims, 1 Drawing Figure

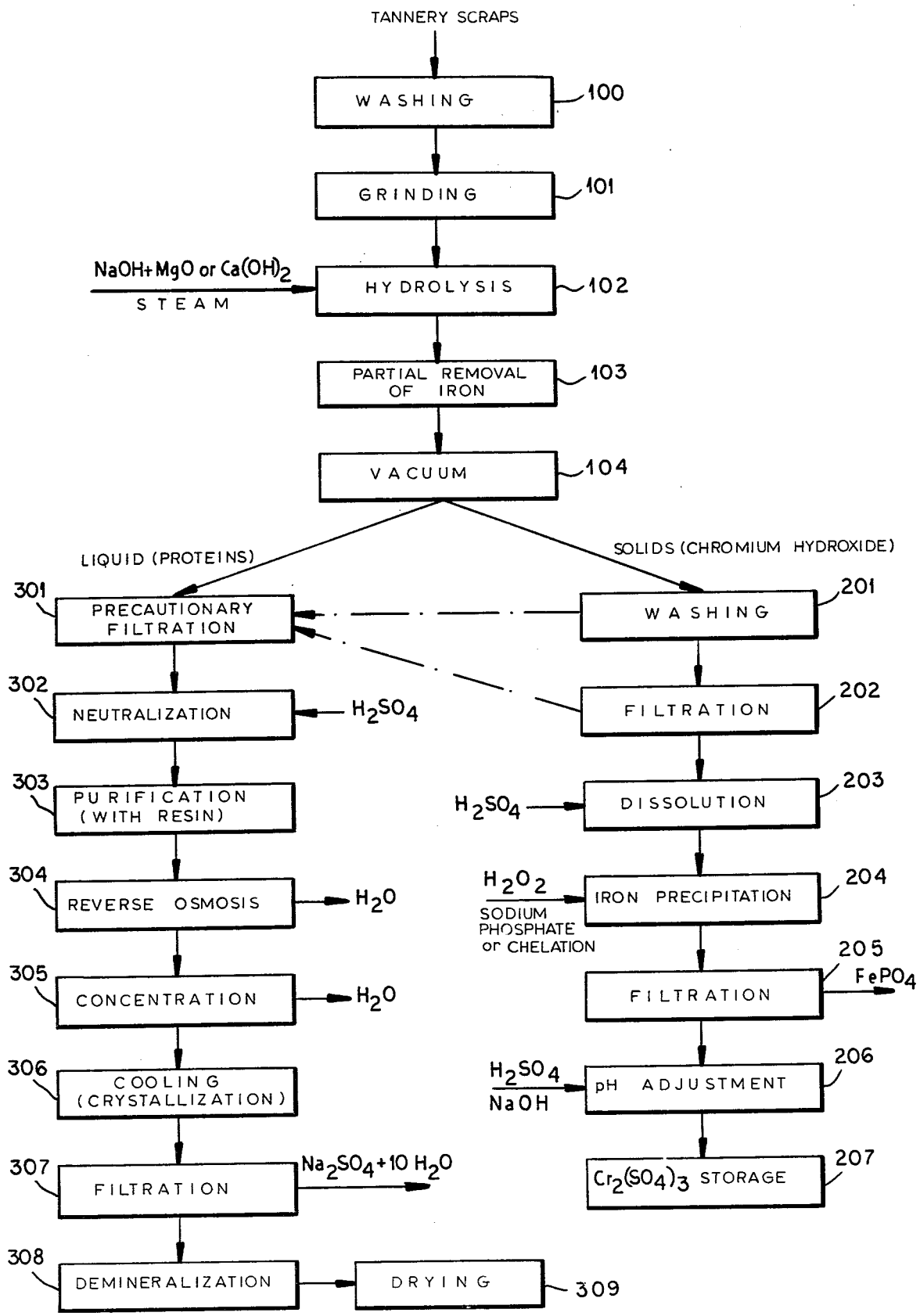

PROCESS FOR RECOVERING PROTEINS AND CHROMIUM FROM CHROME-TANNING WASTE

FIELD OF THE INVENTION

My present invention relates to a process for the treatment of waste products from the chrome-tanning of hides to recover proteins and chromium therefrom.

BACKGROUND OF THE INVENTION

The waste products of tanneries generally are scraps ranging in size from millimeters to several centimeters, including shavings, trimmings and so-called "green" crusts, which are discarded at various stages of the tanning process. These scraps may also include fatty subcutaneous animal tissue subjected to the chrome treatment. The disposal of the scraps creates ecological problems since their mere dumping tends to pollute the environment. Thus, the residual chromium is washed out by rain so as to leave an organic mass susceptible to decay with consequent contamination of water and air.

OBJECTS OF THE INVENTION

An object of my present invention, therefore, is to provide an ecologically satisfactory process for disposing of the above-described waste products.

A related object is to provide a treatment for such waste products designed to reclaim the residual chromium for possible reutilization in tanning, along with a proteinaceous substance of sufficiently high purity to be used as a plant or animal feed.

SUMMARY OF THE INVENTION

A major chemical difficulty in the separate recovery of the chromium and the proteins from the waste products referred to lies in the breaking of the chromium/protein bonds. I have found, in accordance with my present invention, that this can be accomplished by finely comminuting the waste products to be treated and then hydrolyzing the comminuted products at elevated alkalinity and temperature to produce a suspension of solids, consisting essentially of chromium hydroxide, in a polypeptide solution. After these solids are filtered out from the solution, the latter is neutralized and purified to provide a proteinaceous nutriment substantially free from chromium while the solids undergo separate purification.

For the most effective separation of chromium from the organic constituents, the hydrolyzation should be carried out at a temperature between substantially 90° and 100° C., preferably not less than 95° C., and at a pH of at least 10.5, preferably between 11 and 12.5. Advantageously, the comminution is performed in water after a preliminary washing of the scraps. This may be done in a mechanical chopper reducing the scraps to particles of a substantially uniform size on the order of 1 mm. As a hydrolyzing agent I may use the hydroxide of sodium, potassium or calcium, preferably NaOH in a proportion ranging substantially between 4% and 8% (by weight) of the starting products being treated. I also have found it advantageous to admix with the sodium hydroxide a minor proportion—about 0.1% to 1% of the starting products—of calcium hydroxide or of magnesium oxide in order to promote the precipitation of chromium hydroxide.

Since the grinding of the scraps in a chopper may leave ferrous particles such as steel chips in the suspension, these metallic pieces ought to be removed at least in part by sedimentation before the suspended chromium hydroxide is separated—as by vacuum filtering—from the proteinaceous liquor. As the liquid and solid constituents so separated are still highly alkaline, they are now separately treated with an acid—preferably $H_2SO_4$—to lower their respective pH. In the case of the proteinaceous liquor, the acidification is carried only to the neutral level of pH7; with the solids the pH may be lowered to about 3 to produce chromium sulfate $Cr_2(SO_4)_3$. The removal of sodium sulfate from the liquor can be accomplished by cooling same down to about room temperature at which the $Na_2SO_4$ will crystallize and can be filtered out. The remaining organic substance, after drying to a moisture content of preferably not more than about 5%, can be used as a fertilizer or as an animal feed.

BRIEF DESCRIPTION OF THE DRAWING

The above and other features of my present invention will now be described in detail with reference to the accompanying drawing the sole FIGURE of which is a flow diagram showing, by way of example, the steps involved in carrying out the present process.

SPECIFIC DESCRIPTION

As shown in the drawing, tannery scraps to be treated in accordance with my present invention are first washed in water (step 100) and are then ground down, in a step 101, to a particle size of about 1 mm by a mechanical chopper while still in a wet state. This yields a pulpy mass which is hydrolyzed and heated to a temperature of or close to 100° C., in a step 102, by the admixture therewith of steam saturated with sodium hydroxide admixed with a small quantity of magnesium oxide or calcium hydroxide; additional heat may be supplied if needed. This step lasts for several minutes, with continuous agitation of the mass, and results in a pH between about 11 and 12.5. Heavy and abrasive particles such as sand and ferrous chips are then removed to a significant extent by sedimentation, in a step 103, whereupon the suspension obtained in step 102 is centrifugally filtered under vacuum in a step 104 to separate its liquid constituents, essentially a highly alkalinic solution of polypeptides, from a solid filter cake consisting fundamentally of chromium hydroxide.

In a step 201, which may be combined with the filtration step 104, the solids are washed in water for the removal of residual soluble proteins therefrom; these proteins may be combined with the filtered out liquid for purification as described hereinafter. Further solutes to be similarly combined are extracted in a filter press, step 202. The solids are then dissolved, in a step 203, in concentrated (98%) sulfuric acid to obtain chromium sulfate. The resulting solution is treated in a step 204 with hydrogen peroxide designed to oxidize any remaining iron particles from a bivalent to a trivalent state to facilitate their elimination. Such elimination is performed, in the same treatment step, by one of two possible methods. One method comprises the admixture of sodium phosphate in a quantity exceeding somewhat the stoichiometric amount needed for the formation of ferric phosphate $FePO_4$; the latter is filtered out in a subsequent step 205. Another method involves a prefiltering of the solution obtained in step 203, a dilution of that solution after its admixture with $H_2O_2$, and a passage of the mixture through a column containing a chelating resin such as that commercially available under the designation Amberlite XE 318 marketed by the firm of Rohm and Haas. Either of these techniques eliminates practically the entire iron present, leaving a solution which essentially consists of chromium sulfate with a chromium content of 6% to 8% present as chromium oxide. After adjustment—if necessary—of the pH of the solution to a value of substantially 3, as by the addition of sulfuric acid or sodium hydroxide in a step 206, the solution can be stored in a vessel of glass or plastic (step 207) for subsequent re-use in a tanning operation.

The proteinaceous liquor obtained by the filtration step 104 is subjected in a step 301 to a precautionary filtration, e.g. by means of a candle type filter of diatomaceous earth, for the elimination of all traces of chromium. The clear liquid thus obtained is neutralized in a step 302 by the addition of sulfuric acid and is then subjected in a step 303, after dilution, to a further purification for the elimination of possible traces of preservatives such as polyhalogenated phenols contained in the starting material. This latter purification may be carried out in a column of ion-exchange resin of weakly anionic macrocellular type, e.g. one marketed under the designation Duolite A-2, A-4, A-6 or A-7 by Chemical Process Company.

The purified polypeptide solution resulting from step 303, with a content of proteinaceous matter amounting dry to about 12% by weight, is next dehydrated to increase the concentration to about 60%. This can be done in two steps as shown, namely by reverse osmosis (step 304) to a dry-protein content of about 12 to 24% followed by evaporation (step 305) with a progressive decrease in temperature from 100° to 60° C.; step 304 is not essential but results in a saving of thermal energy. After leaving the output of an evaporator used for step 305, which should be of the multi-effect type, the 60% concentrate at 60° C. is progressively cooled in a heat exchanger (step 306) for the elimination of sodium sulfate which begins to crystallize when the temperature of 32° C. is reached, thereby forming sodium sulfate decahydrate $Na_2SO_4.10H_2O$. Crystallization is completed after a few hours, the time varying inversely with the final temperature which may be about 20°-25° C. and which determines the salinity of the remaining solution. The crystals are filtered out in a step 307 and are washed with water which is saturated with sodium sulfate so as not to redissolve them. For a complete elimination of mineral salts from the hydrolyzed proteins, the concentrate may be cooled down to 10° C. in step 306 and, after filtration in step 307, may be rediluted with water and passed in a step 308 through an ion-exchange column similar to that used in step 303. With or without this demineralization step, the proteinaceous liquor may be recycled through some or all of the preceding steps 301-307 for additional purification.

The final product is dried in a step 309 to a solids concentration of about 95% and has the appearance of clear honey. In this form it is readily assimilable and can serve as a good binder for granular feed. Thus, for example, it can be readily admixed as a 2% additive with feed given to fowls and hogs. It can also be used as a fertilizer, or for cosmetic purposes. Furthermore, it can be pulverized, e.g. in a cyclone, to constitute an ivory-colored powder usable inter alia as a 2-3% additive for fish food, e.g. for the raising of trout, or in powdered milk for calves as well as in hog feed. Being highly hygroscopic, the powder may be packed in multilayer paper bags with a polyethylene liner, for example.

Tests have shown that the concentrate obtained from the liquid phase after crystallization at 25° C. (in step 306) contains raw proteins ($N \times 6.25$) in a proportion of 90% by weight of its dry substance and yields 13% ash at 550° C. With crystallization at 10° C. the proportion of raw proteins is 98% while the ash at 550° C. amounts to 7% of the dry substance.

In certain cases, as where the waste products to be treated are subcutaneous tissues having a composition of 80% water, 6% proteins, 7% fat and 7% ash by weight, for example, a preliminary acidic hydrolysis prior to step 102 is necessary to separate the fat from the rest.

EXAMPLE

In step 100, twenty tons of tannery scraps are washed in 40 cubic meters of water at room temperature while being continuously agitated, at a rate of 750 kg per 5 minutes. The scraps include 10 tons of shavings with a composition of 35% proteins, 5% ash and 60% water, by weight, as well as 10 tons of trimmings and crusts with a composition of 40% proteins, 6% ash and 54% water. These scraps, still immersed in the wash water, are chopped to a substantially uniform particle size of about 1 mm in step 101 to provide 60 tons of pulp which is hydrolyzed and heated in step 102 with 1 ton of sodium hydrate and 0.1 ton of magnesium oxide to a pH of 12, at a temperature of 100° C., for 30 minutes. A turbid greenish mixture of polypeptides and chromium hydroxide is passed in step 103 through a hydrocyclone to separate possible ferrous particles therefrom. In step 104 the suspension is separated in a centrifugal filter into a polypeptide solution of about 48 tons and protein-permeated chromium hydroxide of about 12 tons, still at a pH of 12. The chromium hydroxide is treated in step 201 with 12 tons of water at a temperature of 20° C. and is filtered in step 202. Three tons of concentrated sulfuric acid is added in step 203 and is supplemented in step 204 with hydrogen peroxide and sodium phosphate for the elimination of residual iron. After further filtering in step 205, the pH is adjusted to 3 in step 206 whereupon the product is stored in step 207.

After preliminary filtering in step 301, the polypeptide solution is neutralized in step 302 with 0.6 ton of concentrated sulfuric acid and is then purified by ion exchange in step 303 as described above. The purified solution is concentrated in steps 304 and 305, with elimination of 27 tons of water by reverse osmosis and further dehydration in a multi-effect evaporator to provide about 11.6 tons of concentrate. Cooling in step 306 is followed by the removal of about 1 ton of crystallized sodium sulphate in step 307 whereupon the resulting substance is dried to a solids content of 95% in step 309. The proteinaceous product is found to contain, aside from 5% water by weight, raw proteins in a proportion of 94% by weight of the solids, ash 4% and chromium less than 5 ppm. The pH of the solution, measured after dilution at 10% concentration, is 7. The chromium sulfate stored in step 207 is practically free from iron.

In a control test, with the pH in step 102 lowered to 11.5 and the temperature maintained at 100° C., the chromium content in the final proteinaceous substance is still less than 5 ppm. With a pH of 10 at the same temperature, however, that content rises to 500 ppm, whereas with a pH of 11 and a temperature of 85° C. the chromium content is found to be 195 ppm. This shows the criticality of a pH of at least 10.5 and a temperature of at least 90° C. during hydrolyzation.

I also have found that the omission of step 204 results in an iron residue of 2 grams per liter in the chromium sulfate finally obtained. This value can be used as a guide in determining the approximate stoichiometric amount of sodium phosphate used in step 204.

I claim:

1. A process for the treatment of chrome-tanning waste products to recover proteins and chromium therefrom, comprising the steps of:
   (a) comminuting the waste products to be treated;
   (b) hydrolyzing the comminuted products at elevated alkalinity and temperature to produce a resulting suspension of solids in a polypeptide solution, said solids consisting essentially of chromium hydroxide, the hydrolysis being carried out with NaOH added in a proportion ranging between substantially 4% and 8% by weight of the products of step (a) with a minor proportion of an additive selected from the group which consists of $Ca(OH)_2$ and MgO;
   (c) filtering said suspension to separate said solids from said solution;
   (d) neutralizing and purifying said solution to provide a proteinaceous nutriment substantially free from chromium; and
   (e) separately purifying said solids.

2. A process as defined in claim 1 wherein step (b) is performed at a temperature between substantially 90° and 100° C. and at a pH of at least 10.5.

3. A process as defined in claim 2 wherein the proportions of said additive ranges substantially between 0.1% and 1%, by weight, of the products of step (a).

4. A process as defined in claim 2 wherein the neutralization in step (d) is carried out by the addition of $H_2SO_4$ to the solution, followed by a cooling to a temperature low enough to cause crystallization of sodium sulfate and further followed by a removal of the crystallized sodium sulfate by filtration.

5. A process as defined in claim 1 wherein the purification of step (d) is carried out by passing the neutralized solution through an ion-exchange column.

6. A process as defined in claim 5 wherein the removal of crystallized sodium sulfate is followed by a removal of residual salts from the remaining solution through ion exchange.

7. A process as defined in claim 1 wherein step (d) further includes a substantial dehydration of the solution, leaving said nutriment in the form of a powder.

8. A process as defined in claim 7 wherein the solids are dissolved in sulfuric acid to produce $Cr_2(SO_4)_3$.

9. A process as defined in claim 1 wherein step (e) includes dissolving said solids in an acidic medium.

10. A process as defined in claim 9 wherein the dissolved solids resulting from step (e) are freed from accompanying iron by admixture with hydrogen peroxide and sodium phosphate, followed by filtration.

11. A process as defined in claim 9 wherein the dissolved solids resulting from step (e) are freed from accompanying iron by admixture with hydrogen peroxide and subsequent contact with a chelating agent.

12. A process as defined in claim 1 wherein step (a) is carried out in water after a washing of said solids.

13. A process as defined in claim 1 wherein metallic particles present in said suspension are at least partly removed by sedimentation between steps (b) and (c).

14. A process defined in claim 1 wherein step (d) further includes a prefiltering of said solution for the elimination of chromium traces therefrom.

* * * * *